May 22, 1945. T. T. OBERG 2,376,379
ROTATING-BEAM-TUBE FATIGUE TESTING MACHINE
Filed Aug. 25, 1943 5 Sheets-Sheet 4
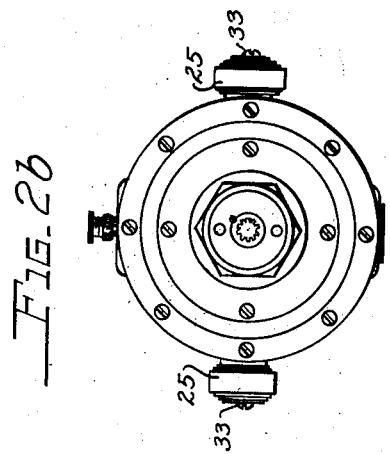
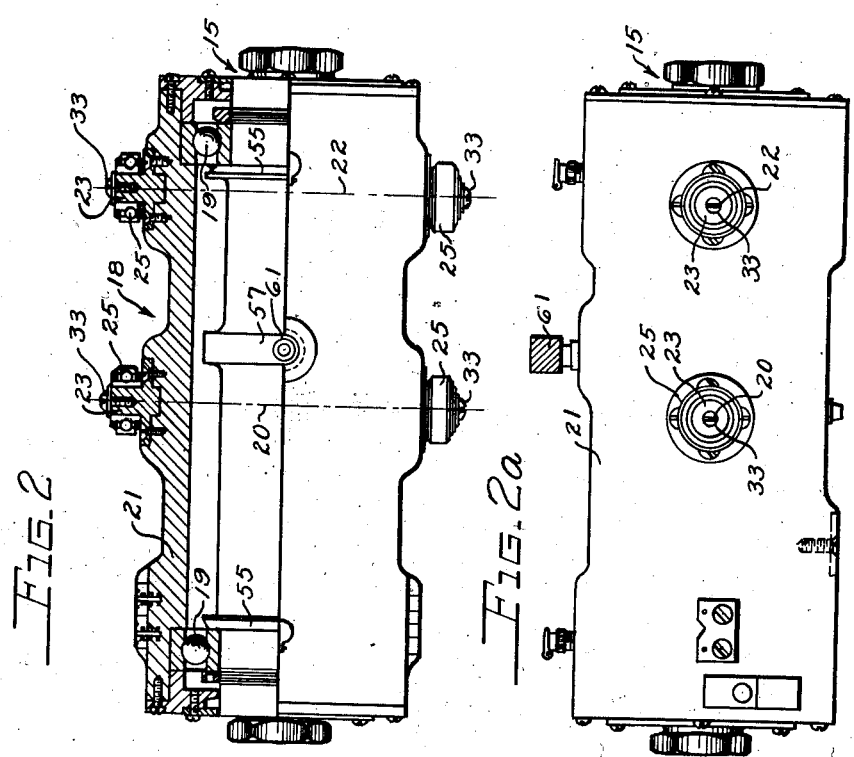
INVENTOR
TURE T. OBERG
BY
ATTORNEYS May 22, 1945.  T. T. OBERG  2,376,379
ROTATING-BEAM-TUBE FATIGUE TESTING MACHINE
Filed Aug. 25, 1943   5 Sheets-Sheet 5
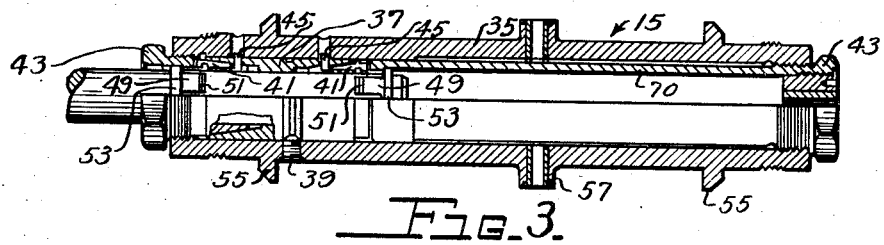
Fig. 3.
Fig. 4.
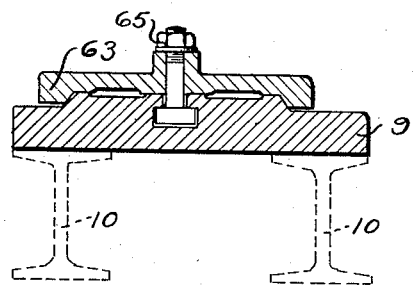
Fig. 5.
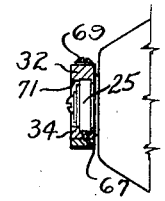
Fig. 6.
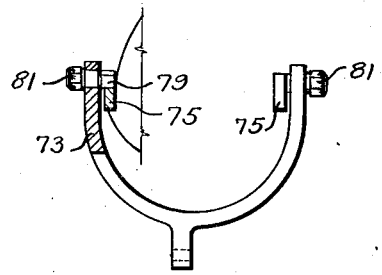
Fig. 7.
Fig. 8.
INVENTOR
TURE T. OBERG
BY
ATTORNEYS Patented May 22, 1945

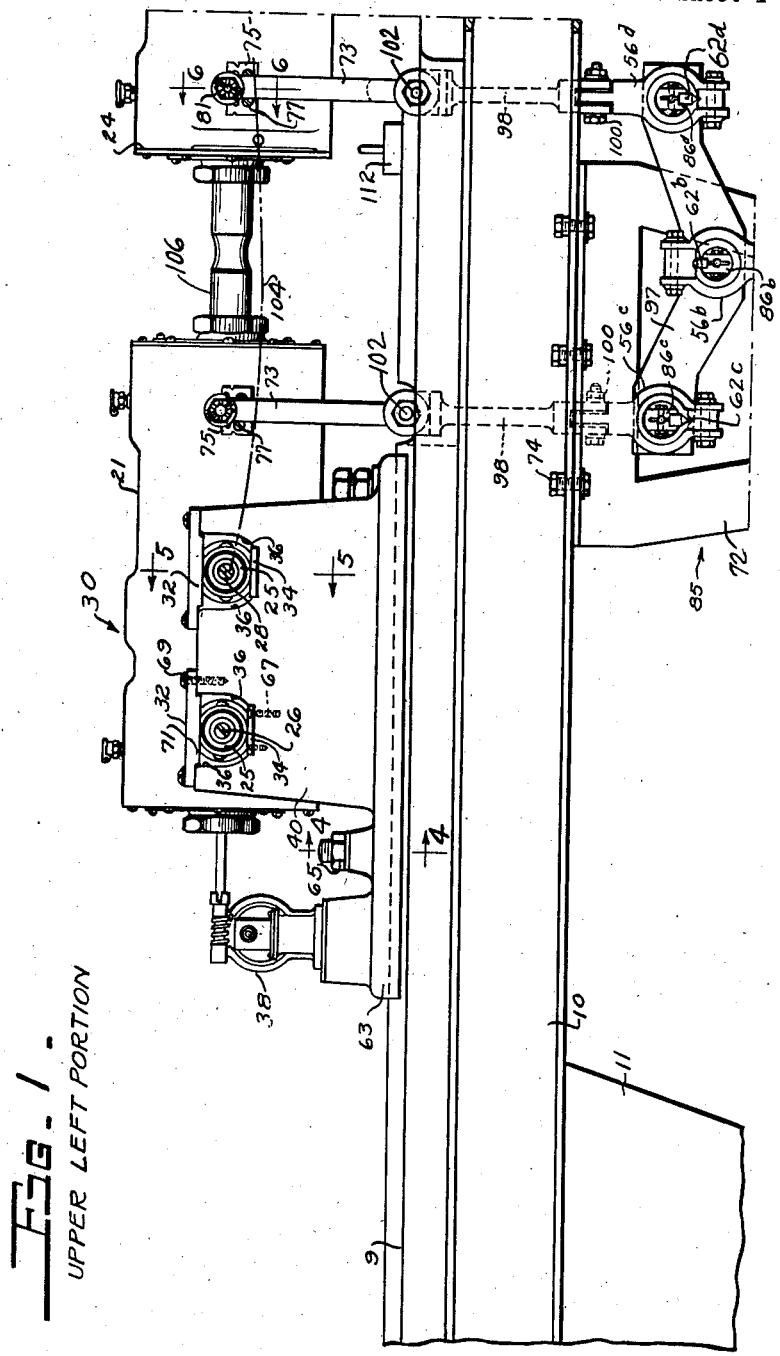

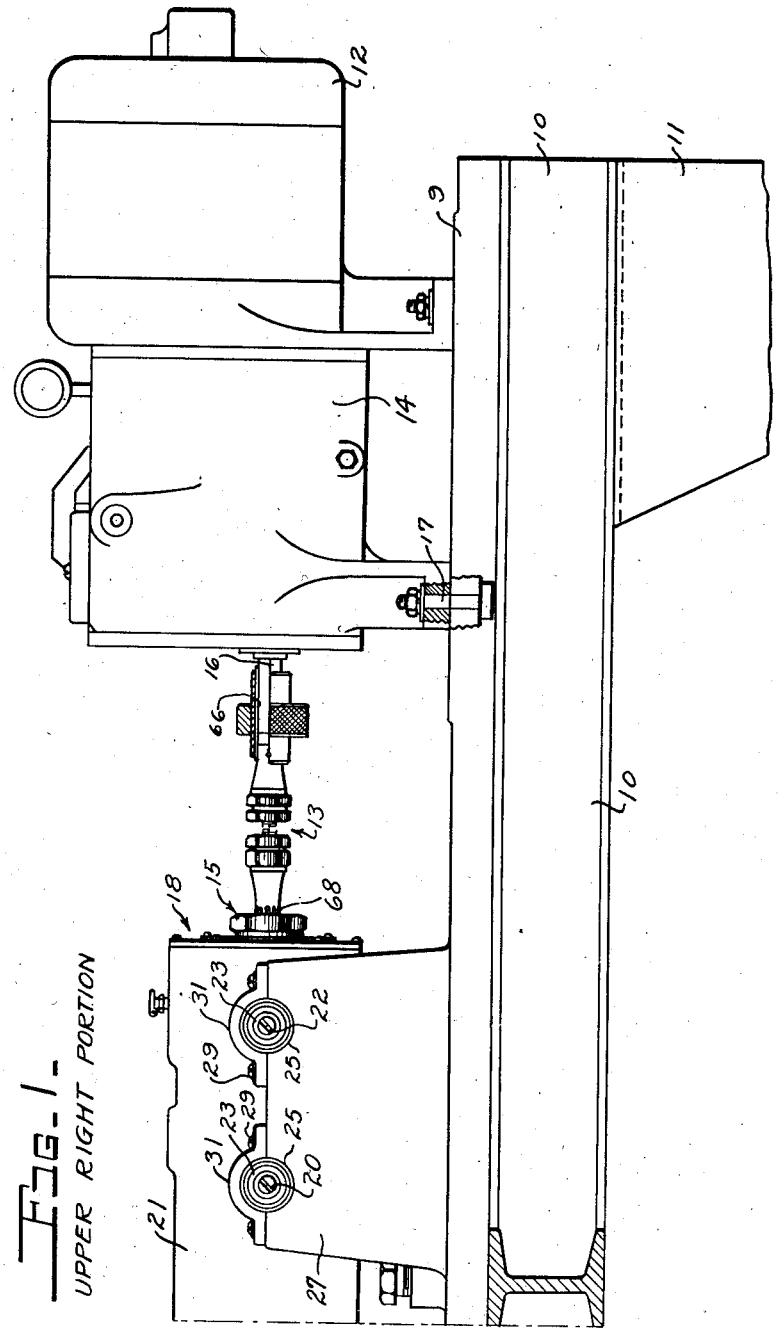

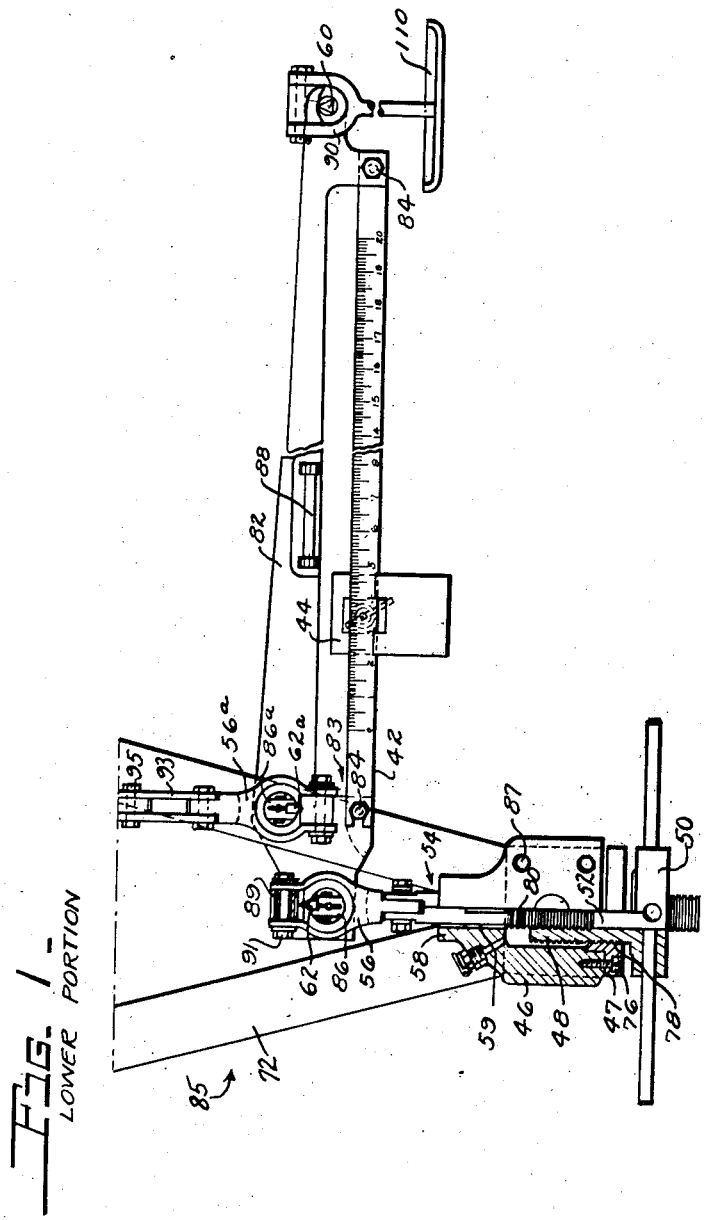

2,376,379

UNITED STATES PATENT OFFICE 2,376,379

ROTATING-BEAM-TUBE FATIGUE TESTING MACHINE

Ture T. Oberg, Dayton, Ohio

Application August 25, 1943, Serial No. 499,884

1 Claim. (Cl. 73—88)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to fatigue testing machines, and particularly to a rotating beam fatigue testing machine of that class wherein the specimen to be tested is rotated while under the downward deflection resulting from a continuously applied bending load, whereby each particle of the tested area is subjected to alternating stresses in tension and compression as the test piece rotates, particles farther from the axis of rotation being, of course, subjected to the greater stresses.

In designing testing apparatus of this character, it is customary to provide test bars and means for holding the ends of a test bar secured in openings which extend into the rotatable hollow spindles of spaced-apart bearing heads, the heads being pivotally supported in a frame on horizontal axes which are normal to the axes of rotation of the spindles, so that the interfacing ends of the bearing heads may be tilted downward by a bending load applied intermediate the pivotal points of the two heads, whereby the axis of the test bar bows downwardly, yet remains in a vertical axial plane while the test bar is rotated.

Obviously, as the mid-portion of the test bar bows downward, the linear distance between its ends shortens, and heretofore, the provision which has been made in the spindles for taking care of this shortening has not had antifriction characteristics, with the result that when a bending load was applied, the specimen was also subjected to a slight tension in the direction of its longitudinal axis. It is therefore one object of this invention to provide means whereby the bearing heads and their pivoting means may move relatively closer together to compensate for the shortening above referred to with minimum tendency to place the specimen in tension.

Heretofore, in machines of this class, a single pivoting means only has been provided on each bearing head, for permitting downward tilting of the interfacing ends of the heads, whereby variation of the applied stress was had only by change in the applied load.

It is therefore another object of this invention to provide an additional pair of pivots on each head, each farther removed from the point of application of the load, whereby a much greater stress may be applied with a given load, when that is desirable, because of the increased mechanical advantage.

Another object of the invention is to incorporate a beam balance in a machine of this type and overcome the difficulties incident thereto.

Other objects will be apparent after a consideration of the following description taken with reference to the drawings wherein:

Fig. 1 is a front elevation of the machine with the beam balance hung underneath.

Figs. 2, 2a and 2b show one of the bearing heads in plan, elevation, and end view respectively, the plan view being partly in longitudinal axial section showing the ball bearings within the heads in which the spindles rotate.

Fig. 3 is an axial section through one of the spindles showing the collet mechanism for gripping the ends of the test bars.

Fig. 4 is a transverse section through the bedplate taken at 4—4 of Fig. 1.

Fig. 5 is a fragmentary transverse section through one of the pivoting bearings taken as at 5—5 of Fig. 1.

Fig. 6 is a fragmentary transverse section through one of the knife-edge pivots upon which the load hangs, the section being taken at 6—6 of Fig. 1.

Fig. 7 shows an aligning bar used for testing the alignment of the spindles of the two heads, one with the other, to ensure that the axes of the two spindles are in the same vertical plane.

Fig. 8 shows a specimen to be tested.

Like numerals refer to like parts throughout the drawings.

Referring now to the drawings, a bedplate 9 is mounted on two longitudinally extending I beams 10, the ends of which are supported on suitable leg structures 11.

Mounted on the extreme right end of the bedplate 9 is an electric motor 12 with a built-on gear box 14, the motor and gear box being of a standard, commercially available pattern with means associated with the gear box to vary the speed of the output shaft 16. An electric switch 112 is placed on the bedplate 9 for controlling the motor 12.

A flexible shaft assembly 13 drivably connects the output shaft 16 to the spindle assembly 15 of the bearing head assembly 18, the flexible shaft assembly being joined to the output shaft 16 by a key 66 and to the spindle assembly 15 by spline means 68. The motor and gear-box unit 12—14 also has provision for some longitudinal movement on the bedplate 9, which becomes available upon loosening the bolts 17, whereby the length of the flexible shaft 13 is not critical, and no unwanted loading will be applied by end thrust in these connections.

The spindle assembly 15 is rotatably supported in the housing 21 of the bearing head 18 by ball bearings 19 (see Fig. 2), the housing 21 being in turn pivotally supported on transverse axes 20 and 22 provided by trunnions 23 carrying ball bearings 25, the ball bearings being in turn supported in pillow blocks 27 (see Fig. 1). Pillow blocks 27 are fast on the bedplate 9, one on each side of the bearing head, the pillow blocks being fitted close up thereto to prevent lateral movement of the bearing head with respect to the bedplate. Since the bearing head 18 may obviously not rock on both axes 20 and 22 at the same time, the ball bearings which provide one of the axes are removed when it is desired to rock on the other. Removing the screws 29, which secure the caps 31 to the blocks 27, facilitates removing the ball bearings which are held on the trunnions 23 by screws 33 (see Fig. 2). As will be hereinafter explained, the loading is so arranged that the front end 24 of the bearing head 18 tips downward when the load is applied. The transverse axis 20 extends through the center of gravity of the head, while the transverse axis 22 is considerably removed therefrom.

The spindle assembly 15, shown in axial section in Fig. 3, consists of a tubular shaft 35, on the ends of which the ball bearings 19 (see Fig. 2) are press fitted. Closely fitted to the inside of the spindle is a collet clamping sleeve 37 which has an annular groove around its outside into which the screw 39 fits to hold the sleeve positioned in the spindle. The ends of the sleeve 37 are internally tapered so that externally tapered split collets 41 may be forced into the sleeve tapers to reduce the internal diameter of the collets and thereby clamp the end of the test bar.

Collet-adjusting screws 43 are threaded into the ends of the spindle for forcing the collets 41 into the tapered ends of the sleeve 37, the rear screw 43 being provided with a long tubular portion 70 in order that it may reach its collet. Key pins 45 are driven into openings in sleeve 37 through clearance openings in the spindle 35, and U-shaped slots in the thinner end of the collets straddle these pins to keep the collets from turning in the sleeve when being tightened by the screws 43. Collet-withdrawing members 49 at one end have hooks 51 which extend into a groove in the inside of the collets, and, at the other end, have an annular rib 53, which lies behind a shoulder in the clamp screws 43, whereby unscrewing of the screw 43 withdraws the collet from the spindle. Flanges 55 provide shoulders against which ball bearings 19 may rest. An annular rib 57 has a series of circumferentially spaced apart holes into which a plug 61 (see Fig. 2) may be inserted through an opening in the top of the housing 21 to keep the spindle 15 from rotating when the collets are being tightened.

The left-end bearing head assembly 30 is substantially like the right bearing head assembly 18 just described, the ball bearings and their axes 26—28 being spaced the same as the axes 20—22, while the spindle and the collet mechanism are substantially identical. The mounting, however, is somewhat different, that is, the pillow blocks 40 are not fast on the bedplate 9, but are fast on a plate 63, which is longitudinally slidable on the bedplate, as shown in Fig. 4, whereby it may be secured to the bedplate by the nut 65 when it is in the desired position.

The mounting of the left-end head differs from that of the right-end head in still another particular, that is, in the support of the trunnion ball bearings 25. Instead of holding the trunnion ball bearings 25 in an annular pocket provided in the block 27 and cap 31, the ball bearings of the left-end head are held between the parallel and plane surfaces on the upper and lower guides 32 and 34 (see Fig. 5) which are secured to the pillow block 40 by screws 67 and 69. A lip 71 on the guide 32 helps hold the trunnion ball bearings in position. The pillow block 40 is then cut away to the lines 36 to provide longitudinal movement of the bearing head 30 along the axis of the spindles. A revolution counter 38 records the total revolutions before failure of a specimen.

Two yokes 73 are pivotally hung from the bearing heads near their interfacing ends on knifeedge pivots, the pivots each consisting of a V block member 75 secured to the housings 21 by screws 77, and a knife-edge member 79 held in the upper end of the yoke 73 by a nut 81 (see Fig. 6). The loading apparatus is hung on the lower ends of the yokes 73.

It is noted that the construction and arrangement of the bearing heads 18 and 30, and their spindle assemblies 15, and their collets 41, is such that when a test piece 106 (see Fig. 8) is clamped in the collets, the two spindles and the test piece become as one beam for the purpose of applying a bending load while the beam is under rotation.

Heretofore, in machines of this class, it has been the custom to attain the required rigidity and the required axial alignment in the connection between the spindles and the test piece by providing the interfacing ends of the two spindles with taper sockets, and the ends of the test piece with taper shanks, which were required to fit the sockets with great accuracy as to size, taper, alignment, and concentricity.

It will be obvious, however, that a test piece having ends of uniform diameter, as at 106, Fig. 8, is much simpler to produce, and, where each end is held in two suitably spaced apart collets, as seen in Fig. 3, the required rigidity and accurate alignment will be had at much less expense. An aligning bar 108, Fig. 7, is provided for the purpose of testing, at intervals, the alignment of the axes of the two bearing heads 18 and 30.

The loading apparatus consists primarily of a beam balance 83, the beam 42 of which must at all times be kept in a horizontal plane in order to transmit the preset load to the specimen at all times. The mechanism for supporting and maintaining the beam balance horizontal includes a hanger 85 secured to the underside of the I beams 10 by bolts 74, the hanger 85 comprising a frame portion 72 with a hub casting 46 secured to its lower end by bolts 87. The underside of the hub casting 46 is closed by a member 47 held on by screws 76.

The member 47 has internal threads 78 which receive the external threads of a hollow screw 48 which is provided at its lower end with a handwheel portion 50. The shank 52 of a clevis 54 has external threads 80 which fit into the internal threads of the hollow screw 48. The arrangement is that of a conventional differential screw, that is, if the pitch of the threads 78 is .175 inch, and the pitch of the threads 80 is .180 inch, then one turn of the hand wheel 50 will raise the clevis .180—.175=.005 inch. Thus a fine adjustment may be had for keeping the beam 42 horizontal.

The clevis 54 is slotted and drilled to pivotally receive a V block hanger 56, the lower end of which is flattened and drilled to correspond to the clevis 54, while the upper end is adapted to hold the V block 89 which is held in place by a bolt 91. Like hangers 56a, 56b, 56c and 56d are used at other places in the structure, as will be hereinafter explained. The neck 58 of the casting 46 is internally splined as at 59 to receive corresponding external splines on the shank of the clevis 54 above the threads 80, whereby the clevis 54 is kept from rotating, but allowed to move vertically in response to rotation of the hand wheel 50.

A beam frame 82, to which the beam 42 is secured by nuts 84, carries the knife-edge holding studs 86 and 86a which hold the knife-edges 62 and 62a, respectively. These two knife-edges are in alignment with a knife-edge 60 provided for supporting the scale pan 110 from hanger 90 at the outer end of the beam frame, and in alignment with each other, all three being in a horizontal plane when the beam 42 is adjusted to a level position. A spirit level 88 on the beam frame 82 is employed to indicate when the beam is adjusted to level position. A runner 44 is slidable on the beam 42 for varying the applied load.

The two hangers 56a and 56b are joined by side plates 93 held on by bolts 95. A yoke 97 carries the knife-edge holding studs 86b, 86c, and 86d, which, together with knife-edges 62b, 62c and 62d, cooperate with hangers 56b, 56c and 56d. Links 98 are joined to the hangers 56c and 56d by bolts 100, the upper ends of the links being joined to the yokes 73 by bolts 102. The links 98 extend through suitable openings in the bedplate 9.

The operation of the device is as follows: The bearing head 30 should preferably be moved to the left on the bedplate 9, this being accomplished by first loosening the nut 65. The one end of the aligning bar 108 should preferably be inserted through both collets 41 of the head 30, and the head 30 then moved toward the right until the aligning bar 108 enters both collets 41 in the head 18. This test is made merely to determine whether the two heads have for any reason gotten out of alignment. The left head 30 should then be withdrawn toward the left until the aligning bar may be removed. The test bar 106 should now be inserted through both collets of the left head 30, and the head again moved toward the right until the test bar enters both collets in the right head 18. The four collets 41 should now be tightened around the test bar by means of the nuts 43, and the left head 30 tightened on the bedplate by means of the nut 65.

Now, since only one pair at a time of the trunnion members of each head may be used, the bearings from the other pair of trunnion members must be removed. Assuming, for example, that it is desired to support the heads on the axes 20 and 28 of the trunnion members, the ball bearings 25 should be removed from the axes 22 and 26, which will leave the heads 18 and 30 rockable solely on the axes 20 and 28, respectively. The machine is now in condition to have the load applied. The approximate load is now put into the scale pan 110, and the runner 44 set to represent the fractional amounts of the load. The hand wheel 50 is then turned right of left until the level 88 indicates that the beam 42 is horizontal. The test bar 106 will now be deflected more or less as on curved line 104, except that, for illustrative purposes, the curve of the line 104 is greatly exaggerated in the drawings.

Inasmuch as the load was applied after the collets and the head 30 were fastened in place, the curving of the axis of the test piece to the line 104 will obviously shorten the distance between the trunnion axes 20 and 28, but this is readily compensated for by the longitudinal movement of the ball bearing 25 between the guides 32 and 34. The motor 12 may now be started, and the test piece rotated. Due to the manner in which the load is applied and the position of the trunnion axes 20 and 28, the axis of rotation of the test bar will remain on the curved line 104. It should be kept in mind, however, that the curved axis 104 will always remain in a vertical plane passing through the normal center line of the bearing heads. Thus, each rotation of the test bar through 180 degrees will alternately put any point on the bar, first in tension, then in compression. The test bar is rotated in this manner until failure occurs. When failure occurs, the interfacing ends of the bearing heads will, of course, drop downward. The electric switch 112, provided for controlling the motor circuit, is so placed on the bedplate that the front end 24 of the bearing head 18 will strike the switch as the head tips downward, and thus shut off the motor until the attendant can remove the broken bar and replace it with another.

Having thus described my invention, I claim:

In a material testing machine of the general character described having load supporting means, a load applying means which comprises a bracket attached to said machine, a load bearing link depending from said load supporting means, a beam adjusting stem extending upwardly from said bracket, a differential screw for adjusting said stem vertically, a scale beam, pivoting means connecting one end of said scale beam to the upper end of said stem, pivoting means connecting the scale beam near said one end to the lower end of said load bearing link, and a spirit level on said scale beam mounted thereon to indicate when said beam is adjusted to level position.

TURE T. OBERG.